United States Patent
Tamada

(10) Patent No.: US 9,079,476 B2
(45) Date of Patent: Jul. 14, 2015

(54) IMPACT ENERGY ABSORBER FOR VEHICLE AND METHOD FOR FORMING THE SAME

(75) Inventor: Teruo Tamada, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 0 days.

(21) Appl. No.: 13/419,538

(22) Filed: Mar. 14, 2012

(65) Prior Publication Data

US 2012/0235443 A1    Sep. 20, 2012

(30) Foreign Application Priority Data

Mar. 15, 2011    (JP) .................................. 2011-057101

(51) Int. Cl.
- *B29C 49/04* (2006.01)
- *B29C 51/02* (2006.01)
- *B60J 5/04* (2006.01)
- *B60R 21/04* (2006.01)

(52) U.S. Cl.
CPC ............... *B60J 5/0451* (2013.01); *B60R 21/04* (2013.01)

(58) Field of Classification Search
None
See application file for complete search history.

(56) References Cited

U.S. PATENT DOCUMENTS

| | | | |
|---|---|---|---|
| 3,887,320 A | | 6/1975 | Erlewine et al. |
| 4,457,797 A | * | 7/1984 | Hatchadoorian et al. ..... 156/242 |
| 5,806,889 A | | 9/1998 | Suzuki et al. |
| 5,857,702 A | | 1/1999 | Suga et al. |
| 6,342,288 B1 | | 1/2002 | Tada et al. |
| 6,878,335 B2 | * | 4/2005 | Britten et al. .................. 264/527 |
| 7,222,897 B2 | * | 5/2007 | Evans et al. .................... 293/120 |
| 2002/0064627 A1 | | 5/2002 | Tada et al. |
| 2005/0161982 A1 | * | 7/2005 | Cormier et al. ............... 296/214 |
| 2007/0080562 A1 | | 4/2007 | Taniguchi et al. |
| 2007/0196601 A1 | * | 8/2007 | Ray et al. ...................... 428/34.1 |
| 2010/0140032 A1 | | 6/2010 | Tamada |

FOREIGN PATENT DOCUMENTS

| | | |
|---|---|---|
| EP | 0967124 A2 | 12/1999 |
| EP | 1693255 A1 | 8/2006 |
| FR | 2774144 A1 | 7/1999 |
| GB | 1136613 A | 12/1968 |
| JP | 2775146 B2 | 7/1998 |

(Continued)

OTHER PUBLICATIONS

European Search Report dated May 12, 2015, which issued during the prosecution of European Patent Application No. 12159689.4, which corresponds to the present application.

*Primary Examiner* — Monica Huson
(74) *Attorney, Agent, or Firm* — Troutman Sanders LLP

(57) ABSTRACT

The resin impact energy absorber for vehicle includes a peripheral wall, a planar portion surrounded by the peripheral wall, and a plurality of first protrusions. The first protrusions are parallel to one another at a predetermined interval in the planar portion. The first protrusion includes a pair of inclined vertical walls and a top wall. The pair of inclined vertical walls projects from the planar portion. The inclined vertical walls face one another. The top wall couples tops of the inclined vertical walls with one another at approximately the same height as the peripheral wall. The inclined vertical walls are inclined at a predetermined inclination angle such that the inclined vertical walls come close to one another as approaching from the planar portion to the top wall. The planar portion includes one plate surface and another plate surface. At least one of them includes an impact load receiving surface.

17 Claims, 11 Drawing Sheets

(56) References Cited

FOREIGN PATENT DOCUMENTS

| | | | |
|---|---|---|---|
| JP | 3186563 | B2 | 7/2001 |
| JP | 2007098985 | A | 4/2007 |
| JP | 4597832 | B2 | 12/2010 |
| WO | 2008105517 | A1 | 9/2008 |

* cited by examiner

FIG. 15

| CASE | SPECIFICATIONS | WEIGHT (g), THICKNESS (mm) | ABSORBED ENERGY AT COMPRESSIVE STRAIN OF 70% | | | EVALUATION |
|---|---|---|---|---|---|---|
| | | | WHOLLY UNIFORM LOAD [J] | LOCAL LOAD [J], [%] | OBLIQUE LOAD [J], [%] | |
| 1 | HOLLOW WALL STRUCTURE (TRUNCATED CONE-SHAPED RIB) | 100/1.2 | 150 | 70, 47 | 120, 80 | GOOD |
| 2 | SINGLE WALL STRUCTURE (TRUNCATED CONE-SHAPED RIB) | 80/1.9 | 148 | 30, 20 | 64, 43 | POOR |
| 3 | SINGLE WALL STRUCTURE (RIB IN LONG DEEP GROOVE SHAPE) WITH WIDTH OF 5 mm | 80/1.9 | 151 | 45, 30 | 54, 36 | POOR |
| 4 | SINGLE WALL STRUCTURE (RIB IN LONG DEEP GROOVE SHAPE) WITH WIDTH OF 10 mm | 80/1.9 | 154 | 68, 44 | 75, 49 | MEDIUM |
| 5 | SINGLE WALL STRUCTURE (RIB IN LONG DEEP GROOVE SHAPE) WITH WIDTH OF 10 mm + LONG SHALLOW GROOVE | 80/1.9 | 151 | 68, 45 | 110, 72 | GOOD |

IMPACT ENERGY ABSORBER FOR VEHICLE AND METHOD FOR FORMING THE SAME

CROSS-REFERENCE TO RELATED APPLICATION

This application claims priority from Japanese Patent Application No. 2011-057101 filed with the Japan Patent Office on Mar. 15, 2011, the entire content of which is hereby incorporated by reference.

BACKGROUND

1. Technical Field

The present disclosure relates to a resin energy absorber and a method for forming the resin energy absorber. In particular, the disclosure relates to a resin energy absorber that ensures sufficient deformation stroke not only in the case where a uniform impact load is applied to the whole energy absorber but also in the case where an impact load is applied from an oblique direction. This resin energy absorber reduces local variation in energy-absorbing property. In particular, the disclosure also relates to a method for forming the resin energy absorber that has: a low-cost, lightweight, and simplified structure; and a satisfactory energy-absorbing property. This method forms the resin energy absorber with satisfactory formability.

2. Related Art

An impact energy absorber for vehicle protects an occupant inside the vehicle by absorbing impact energy caused by external impact load due to vehicle crash. The impact energy absorber for vehicle is installed, for example, inside a door panel or a ceiling panel.

An impact load by an unexpected vehicle crash makes it difficult to predict a position and a direction of the impact applied to the impact energy absorber for vehicle. Enlarging a surface for receiving this impact load in the impact energy absorber for vehicle to deal with the unpredictable impact load makes it difficult to reduce the weight of the vehicle.

The impact energy absorber for vehicle includes one of structures that are classified broadly into a grid-shaped rib type, a truncated-cone-shaped rib type, and a long-groove-shaped rib type.

Japanese Patent No. 2775146 discloses the grid-shaped rib type. The grid-shaped rib type is made from synthetic resin material. The grid-shaped rib type has, on its one surface of a planar top panel, plate-shaped ribs with predetermined height disposed upright in a grid pattern. The plate-shaped ribs are coupled to one another in the grid pattern and are integrally deformed upon receiving an impact load. This reduces local variation in absorbing property of the impact energy absorber for vehicle. This structure increases a repulsion force in response to the impact load, thus making it difficult to sufficiently deform the impact energy absorber for vehicle by the impact load. In view of this, this structure has difficulty in ensuring a desired impact energy-absorbing property.

Further, the grid-shaped rib type is formed by injection forming. The injection forming requires the grid-shaped rib disposed upright relative to a top panel. In view of this, in the case where an impact load is obliquely applied to the load receiving surface of the impact energy absorber for vehicle, the grid-shaped rib tends to fall down. This makes it difficult to ensure a sufficient deformation stroke. Due to the grid-shaped rib, on the other hand, there is a limit to thinning the impact energy absorber for vehicle. This increases the repulsion force of the impact energy absorber for vehicle. This makes it difficult to sufficiently deform the impact energy absorber for vehicle under the impact load.

Japanese Patent No. 3186563 discloses the grid-shaped rib type, similarly to Japanese Patent No. 2775146. The grid-shaped rib type includes a plurality of ribs, which are oriented in a predetermined direction and disposed in a grid pattern, and a base plate that is integrally formed with respective ends of the plurality of ribs. The plurality of ribs is installed on the base plate along the direction of the impact load. The injection forming requires a draft angle. The draft angle thickens a root portion of the rib, thus making it difficult to deform the rib. The rib includes a cross-sectionally reduced portion made by forming a cut-out portion. The cross-sectionally reduced portion reduces an increase of the deformation load when the deformation, which is caused by the impact load, of the ribs advances toward the base plate of the ribs. This actively promotes the deformation of the ribs.

However, the grid-shaped ribs are formed by injection forming similarly to Japanese Patent No. 2775146. This requires the grid-shaped rib disposed upright relative to the base plate. In view of this, the grid-shaped ribs easily fall down in the case where the impact load is obliquely applied to the load receiving surface of the impact energy absorber for vehicle. This makes it difficult to ensure a sufficient deformation stroke.

Japanese Patent No. 4597832 discloses the truncated-cone-shaped rib structure. The truncated-cone-shaped rib type is made from synthetic resin. The truncated-cone-shaped rib type includes a plurality of truncated-cone-shaped ribs arranged at required intervals, and surface connecting portions, which are located in areas where the truncated-cone-shaped rib is missing. The surface connecting portion is coupled to bottom portions of these truncated-cone-shaped ribs to be supported. The truncated-cone-shaped ribs include a plurality of slits around the truncated-cone-shaped ribs, the slits allowing outer peripheral side faces of the truncated-cone-shaped ribs to deform outward when the truncated-cone-shaped ribs are crushed and deformed. This structure increases the repulsion force since the truncated-cone-shaped ribs are each independent. This structure sufficiently deforms the impact energy absorber for vehicle under the impact load. However, this structure is likely to cause local variation in absorbing property of the impact energy absorber for vehicle.

More specifically, the truncated-cone-shaped rib type has a plurality of slits around the truncated-cone-shaped ribs. The truncated-cone-shaped ribs tend to cause circular apical surfaces of the truncated-cone-shaped ribs to bottom out in the case where the impact load is squarely applied to the load receiving surface of the impact energy absorber for vehicle. This makes it difficult to ensure the sufficient deformation stroke of the impact energy absorber for vehicle. On the other hand, the truncated-cone-shaped ribs tend to fall down in the case where the impact load is obliquely applied to the load receiving surface of the impact energy absorber for vehicle. This makes it difficult to ensure the sufficient deformation stroke of the impact energy absorber for vehicle.

WO 2008/105517 A discloses the long-groove-shaped rib type. The long-groove-shaped rib type includes a first wall on the impact-receiving side, a second wall facing the first wall through a hollow portion at a distance, a deep groove portion, and a plurality of impact absorbing ribs. The deep groove portion includes a melt-bonding surface that is formed by hollowing each of the first wall and the second wall to make long groove shapes and integrally bonding respective apical surfaces of the long groove shapes. The plurality of impact absorbing ribs includes a shallow groove portion that faces the apical surface of the deep groove portion at a distance. The long-groove-shaped rib type is different from a configuration disclosed in Japanese Patent No. 4597832 in the following points. The long-groove-shaped rib type includes a long groove formed by "vacuuming respective mold-side surfaces of two sheets of molten thermoplastic resin toward corresponding molds" or "applying pressure to the respective other surfaces of the two sheets of molten thermoplastic resin sheets toward the corresponding molds". The long-groove-shaped rib type is integrally formed by melt-bonding with the apical surfaces of the long grooves by clamping split mold blocks. The long-groove-shaped rib type includes a hollow portion that is formed through formation of a ring-shaped parting line.

This configuration ensures reduced local variation in absorbing property of the plurality of impact absorbing ribs in a long groove shape, compared with the independent truncated-cone-shaped rib disclosed in Japanese Patent No. 4597832. However, the long-groove-shaped rib type lacks a rib oriented across the plurality of impact absorbing ribs. This is likely to cause the impact absorbing ribs to fall down in the case where the impact load is obliquely applied to the load receiving surface of the impact energy absorber for vehicle. This makes it difficult to ensure a sufficient deformation stroke of the impact energy absorber for vehicle.

Additionally, the long-groove-shaped rib type increases air pressure in a hermetic hollow portion in the case where the impact load is squarely applied to the load receiving surface of the impact energy absorber for vehicle. This increase in the air pressure increases a repulsion force, which makes it difficult to ensure the sufficient deformation stroke of the impact energy absorber for vehicle under the impact load. This makes it difficult for the impact energy absorber for vehicle to have a desired energy-absorbing property. This requires an extra process such as providing an opening on the load receiving surface.

SUMMARY

A resin impact energy absorber for vehicle according to one aspect of this disclosure has a single wall solid plate structure. The resin impact energy absorber includes a peripheral wall, a planar portion surrounded by the peripheral wall, and a plurality of first protrusions. The first protrusions are parallel to one another at a predetermined interval in the planar portion. The first protrusion includes a pair of inclined vertical walls and a top wall. The pair of inclined vertical walls projects from the planar portion. The inclined vertical walls face one another. The top wall couples tops of the pair of inclined vertical walls with one another at approximately the same height as the peripheral wall. The pair of inclined vertical walls is inclined at a predetermined inclination angle such that the pair of inclined vertical walls comes close to one another as approaching from the planar portion to the top wall. The planar portion includes one plate surface and another plate surface. At least one of the one plate surface and the other plate surface includes an impact load receiving surface.

BRIEF DESCRIPTION OF DRAWINGS

FIG. 14A is a cross-sectional view of the impact energy absorber before the deformation, FIG. 14B is a cross-sectional view of the impact energy absorber when a impact load is applied to a long groove side, and FIG. 14C is a cross-sectional view of the impact energy absorber when the impact load is applied from the opposite direction to that in FIG. 14B; and FIG. 15 is a table of test conditions and test results of the impact energy absorber according to the embodiment.

DESCRIPTION OF EMBODIMENTS

Figure 1:
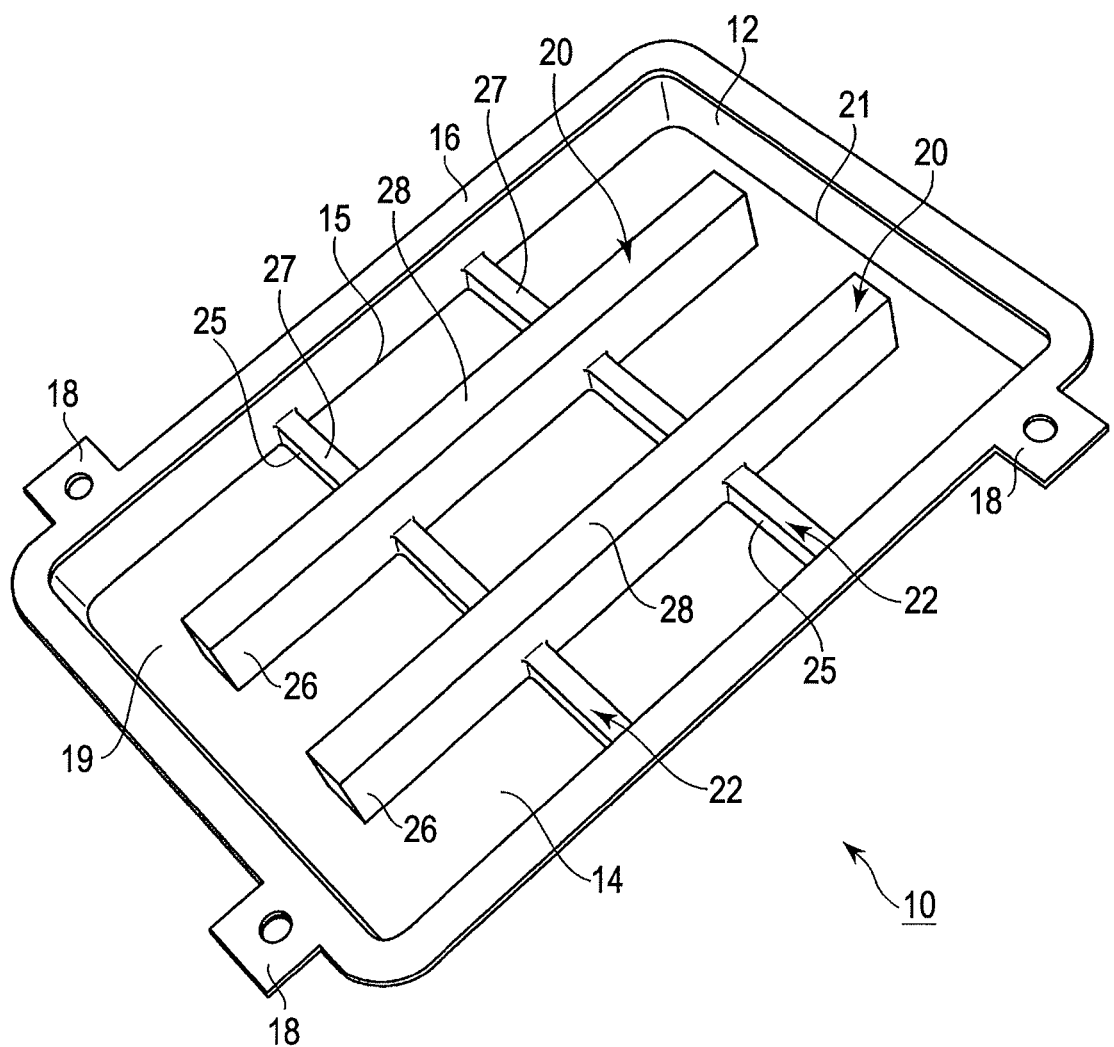
FIG. 1 is a perspective view of an impact energy absorber according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

It is an object of this disclosure to provide a resin impact energy absorber that ensures a sufficient deformation stroke not only in the case where a uniform impact load is applied to the whole energy absorber but also in the case where an impact load is obliquely applied. The resin impact energy absorber also reduces local variation in energy-absorbing property.

It is another object of this disclosure to provide a method for forming a low-cost and lightweight resin energy absorber with a simple structure. The lightweight resin energy absorber has a good energy-absorbing property with a good formability.

A resin impact energy absorber for vehicle according to one aspect of this disclosure has a single wall solid plate structure. The resin impact energy absorber includes a peripheral wall, a planar portion surrounded by the peripheral wall, and a plurality of first protrusions. The first protrusions are parallel to one another at a predetermined interval in the planar portion. The first protrusion includes a pair of inclined vertical walls and a top wall. The pair of inclined vertical walls projects from the planar portion. The inclined vertical walls face one another. The top wall couples tops of the pair of inclined vertical walls with one another at approximately the same height as the peripheral wall. The pair of inclined vertical walls is inclined at a predetermined inclination angle such that the pair of inclined vertical walls comes close to one another as approaching from the planar portion to the top wall. The planar portion includes one plate surface and another plate surface. At least one of the one plate surface and the other plate surface includes an impact load receiving surface.

With the resin impact energy absorber for vehicle thus configured, the first protrusions independently deform when the impact load is applied to the one plate surface or the other plate surface of the planar portion. This reduces increase in repulsion force in response to the impact load. The first protrusion may be formed by forming the first long deep groove from the one plate surface to the other plate surface. The first protrusion includes the pair of inclined vertical walls facing one another, and the top wall that couples tops of the pair of inclined vertical walls with one another at approximately the same height as the peripheral wall.

In the resin impact energy absorber for vehicle, the pair of inclined vertical walls is inclined at a predetermined inclination angle such that the pair of inclined vertical walls comes close to one another as approaching from the planar portion to the top wall. This inclination causes the top walls and the respective inclined vertical walls of the plurality of first protrusions to receive the impact load in the case where the impact load is applied in a direction approximately perpendicular to the planar portion. This reduces bottoming of the top wall against the planar portion. This ensures a sufficient absorption stroke of the impact energy. The resin impact energy absorber for vehicle may include the second protrusion. The second protrusion couples the inclined vertical walls of the adjacent first protrusion with one another, and also couples the peripheral wall with the inclined vertical walls of the adjacent first protrusion. This prevents the inclined vertical wall from falling down and ensures a sufficient absorption stroke of the impact energy even in the case where the impact load is obliquely applied. The resin impact energy absorber for vehicle ensures a sufficient absorption stroke not only in the case where a uniform impact load is applied to the whole energy absorber but also in the case where the impact is obliquely applied. Additionally, the resin impact energy absorber for vehicle reduces local variation in energy-absorbing property.

The first protrusion may have a cross-sectional surface with a trapezoidal shape perpendicular to an extending direction of the first protrusion. The top wall may have a rectangular shape.

The first protrusions may be arranged such that the predetermined interval between the adjacent first protrusions is equal to or larger than a protrusion height of the first protrusions.

Further, the first protrusion may have the top wall with a width of 8 to 25 mm and the protrusion height of 10 to 90 mm.

The planar portion has a rectangular shape with one pair of opposing sides and the other pair of opposing sides. The first protrusion extends parallel to the one pair of opposing sides. The second protrusion may extend in a straight line parallel to the other pair of opposing sides so as to couple the one pair of opposing sides with one another.

Further, the first protrusions may extend over the whole one pair of opposing sides of the rectangle planar portion.

The plurality of first protrusions may be formed by forming a plurality of long grooves along a mold cavity. The plurality of long grooves is formed by at least one of vacuuming and pressing. The vacuuming includes vacuuming the molten thermoplastic resin sheet from the mold cavity side. The pressing includes pressing the molten thermoplastic resin sheet from the opposite side of the mold cavity.

The predetermined inclination angle may be 3 to 10 degrees.

Additionally, the peripheral wall may include a projecting flange at the outer peripheral edge of the peripheral wall. The projecting flange projects outward from the planar portion. The projecting flange may include an installation portion to be coupled with a vehicle.

A method for forming a resin impact energy absorber for vehicle according to one aspect of this disclosure includes: locating a molten thermoplastic resin sheet to face a mold cavity such that the molten thermoplastic resin sheet has an outer border outside the mold cavity, wherein the mold cavity has a long groove to form a protrusion of the resin impact energy absorber for vehicle on a surface of the mold cavity; forming a hermetic space between the mold cavity and a surface of the thermoplastic resin sheet that faces the mold cavity; and forming by vacuuming the thermoplastic resin sheet through the hermetic space so as to press the thermoplastic resin sheet against the mold cavity. The method forms a protrusion having a complementary shape to the long groove by projecting the thermoplastic resin sheet from a surface facing the mold cavity to a surface at the mold cavity side.

The method for forming a resin impact energy absorber for vehicle forms the following resin impact energy absorber for vehicle different from a conventional configuration that absorbs impact energy through grid-shaped ribs formed by the injection forming method. The resin impact energy absorber for vehicle receives the impact load with simplified protrusions in a long groove shape disposed in the planar portion. This prevents the protrusions from falling down while keeping thin protrusions themselves even in the case where the impact load is obliquely applied. This results in ensuring a deformation stroke. On the other hand, in the case where the impact load is locally applied, decreasing the grid width of the grid-shaped ribs causes bottoming of the ribs. In contrast to this, this resin impact energy absorber for vehicle reduces a possibility of such bottoming out and ensures a deformation stroke. The method for forming a resin energy absorber has a low-cost, lightweight, and simplified structure and forms a resin energy absorber having a good energy-absorbing property with a good formability.

The cavity may include a planar portion including: a plurality of first slender protrusions disposed at first predetermined intervals; and a plurality of second slender protrusions that extends perpendicularly intersecting with the plurality of first slender protrusion. The plurality of second slender protrusions is disposed at second predetermined intervals. The plurality of first slender protrusions may have a protrusion height from the planar portion lower than a protrusion height of the plurality of second slender protrusions from the planar portion.

A method for forming a resin impact energy absorber for vehicle according to another aspect of this disclosure includes: supplying a molten thermoplastic resin sheet in a vertically downward direction from an extrusion die, wherein the extrusion die is vertically located above a pair of split mold blocks, wherein the pair of split mold blocks includes a mold cavity with a protrusion on a surface of the mold cavity and a pinch-off portion formed in a circular pattern around the mold cavity; locating the thermoplastic resin sheet between the pair of split mold blocks such that the molten thermoplastic resin sheet has an outer border outside the mold cavity; forming a hermetic space between the mold cavity and a surface of the thermoplastic resin sheet that faces the mold cavity; forming by vacuuming the thermoplastic resin sheet through the hermetic space so as to press the thermoplastic resin sheet against the mold cavity; forming a protrusion having a complementary shape to the long groove by projecting the thermoplastic resin sheet from a surface facing the mold cavity to a surface at the mold cavity side; and forming the thermoplastic resin sheet by clamping the pair of split mold blocks by bringing the pinch-off portion in contact.

The method may further include forming the thermoplastic resin sheet in the hermetic space by at least one of pressing and vacuuming. The pressing includes pressing a hermetic space in the pair of split mold blocks. The hermetic space is formed by clamping the pair of split mold blocks. The vacuuming includes vacuuming inside the hermetic space though the clamped pair of split mold blocks.

A resin impact energy absorber for vehicle 10 according to the embodiment will be specifically described below by referring to the accompanying drawings.

Figure 2:
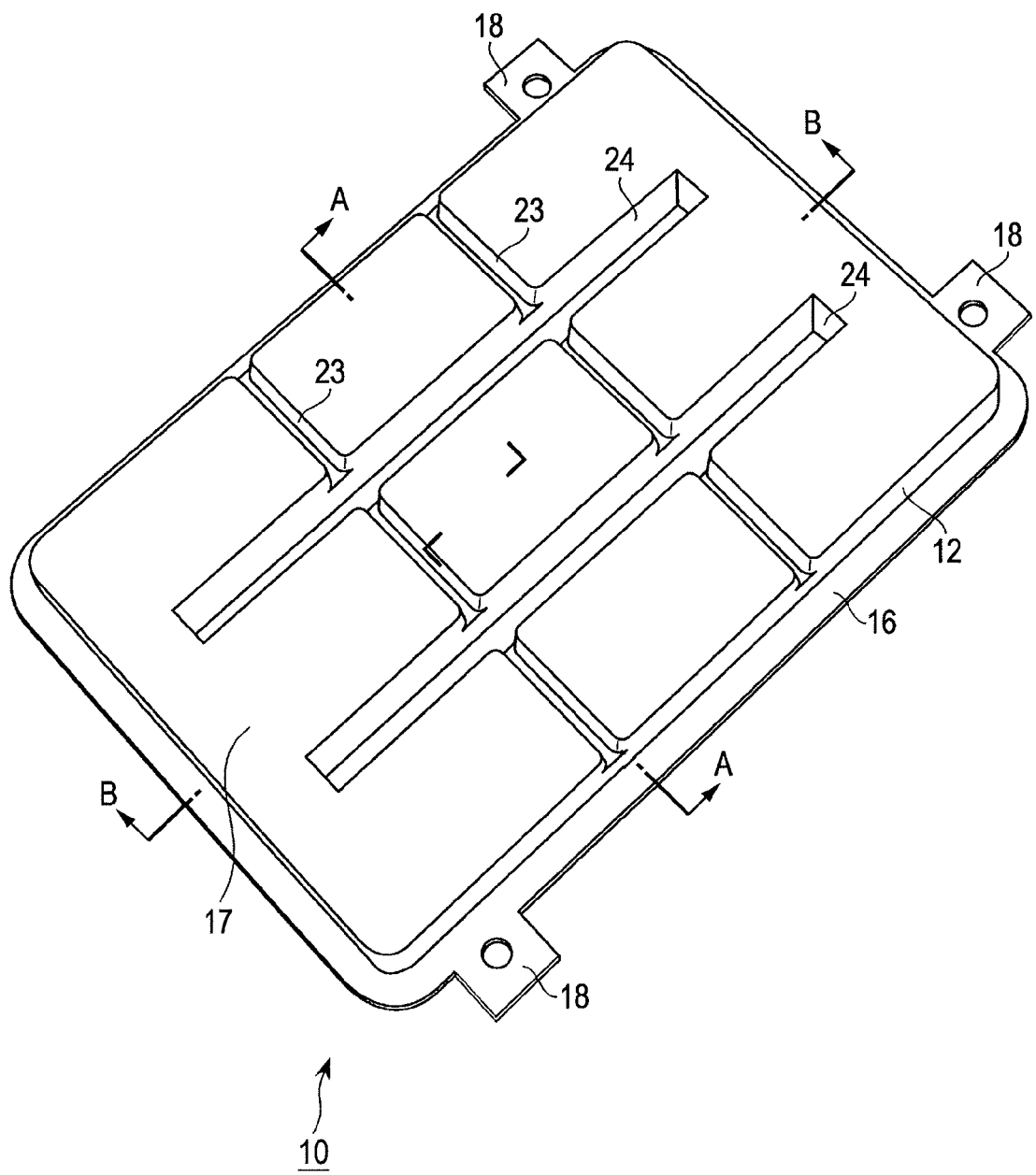
FIG. 2 is a perspective view of the impact energy absorber according to the embodiment as viewed from the opposite direction to that in FIG. 1.

As illustrated in FIGS. 1 and 2, the impact energy absorber for vehicle 10 has a single wall structure that is made of resin and has a rectangular sheet shape. The impact energy absorber for vehicle 10 is integrally formed by a forming method described later. The impact energy absorber for vehicle 10 includes a peripheral wall 12 and a rectangular-shaped planar portion 14, which is surrounded by the peripheral wall 12. A height of the peripheral wall 12 and a size of the rectangular-shaped planar portion 14 may be determined in accordance with an installation position of the impact energy absorber for vehicle 10 in a vehicle and an assumed impact load.

The peripheral wall 12 includes an outer peripheral edge with a projecting flange 16 that projects outward from the rectangular planar portion 14. The projecting flange 16 includes an installation portion 18 that installs the impact energy absorber for vehicle 10 to the vehicle.

As material of the impact energy absorber for vehicle 10, olefin-based resin such as polyethylene and polypropylene, or thermoplastic resin such as amorphous resin is available. More specifically, olefin homopolymer such as ethylene, propylene, butene, isoprene pentene, and methyl pentene, and copolymer such as polyolefin (for example, polypropylene, high density polyethylene) are available.

As illustrated in FIG. 1, the rectangular planar portion 14 has two first protrusions 20 arranged in two rows and two second protrusions 22 arranged in two rows on its plane.

The first protrusion 20 extends parallel to opposing sides 15, each of which is disposed on one side of the rectangular planar portion 14, over approximately the whole one opposing side 15. The first protrusion 20 is separated from the adjacent one opposing side 15 at a predetermined interval.

Figure 3:
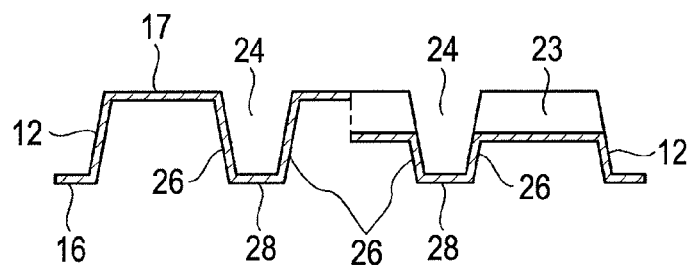
FIG. 3 is a cross-sectional view of the impact energy absorber taken along the line A-A of FIG. 2.

As illustrated in FIGS. 2 and 3, the first protrusion 20 is configured by forming long deep grooves 24 from one plate surface 17 to the other plate surface 19 of the rectangular planar portion 14. The first protrusion 20 includes a pair of inclined vertical walls 26 facing one another and a top wall 28, which couples tops of the respective inclined vertical walls 26 at approximately the same height of the peripheral wall 12.

The pair of inclined vertical walls 26 facing one another is inclined at a predetermined inclination angle α (see FIG. 14) such that the pair of inclined vertical walls 26 comes close to one another as approaching from the rectangular planar portion 14 to the top wall 28. The first protrusion 20 has a cross-sectional surface with a trapezoidal shape perpendicular to the extending direction of the first protrusion 20. The top wall 28 has a rectangular shape.

A thickness of a single rectangular thin plate is determined, as described later, such that the impact energy absorber for vehicle 10 has a desired energy-absorbing property and ensures lightweight. The thickness of a single rectangular thin plate is determined in accordance with a protrusion height H of the first protrusion 20, a width W of the top wall 28 of the first protrusion 20, an inclination angle α of the inclined vertical wall, and a distance D between the adjacent first protrusions 20 (see FIG. 14).

In particular, the predetermined inclination angle α may be determined in the following respects, as described later. This requires preventing the inclined vertical walls 26 from falling down in the case where an impact load is obliquely applied to the rectangular planar portion 14. This also requires preventing the top wall 28 from depressing (bottoming) against the rectangular planar portion 14 in the case where an impact is perpendicularly (squarely) applied to the rectangular planar portion 14. The predetermined inclination angle α is preferred to be 3 to 10 degrees. If the predetermined inclination angle α is smaller than 3 degrees, it is effective to prevent the top wall 28 from bottoming while the inclined vertical walls 26 tend to fall down. On the other hand, if the predetermined inclination angle α is larger than 10 degrees, it is effective to prevent the inclined vertical walls 26 from falling down while the top wall 28 tends to bottom out.

The top wall 28 includes a top surface that has the same height as the top surface of the projecting flange 16. This allows not only the first protrusions 20 but also the peripheral wall 12 to receive an impact load when the impact load is applied to the impact energy absorber for vehicle 10. This ensures sufficient deformation stroke of the impact energy absorber for vehicle 10, thus absorbing the impact energy by elastic deformation or plastic deformation.

In this respect, in order to obtain a desired energy-absorbing property, the top wall 28 may have a width W of 8 to 25 mm, the first protrusions 20 may have a protrusion height H of 10 to 90 mm, and a distance D between the first protrusions 20 may be equal to or more than the protrusion height H of the first protrusions 20.

Figure 4:
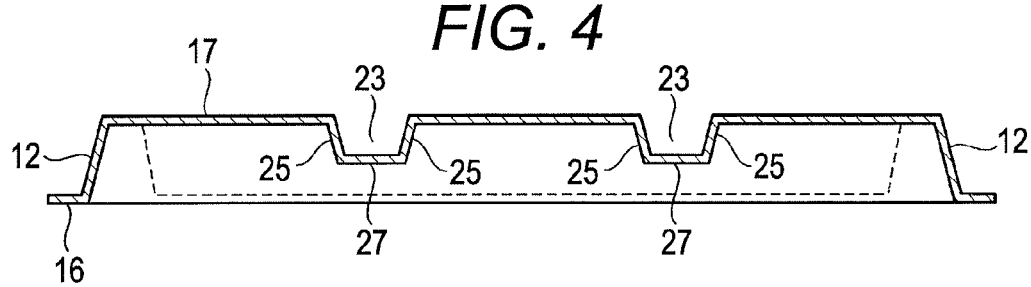
FIG. 4 is a cross-sectional view of the impact energy absorber taken along the line B-B of FIG. 2.

In contrast, as illustrated in FIG. 1, the second protrusion 22 extends in a straight line similarly to the first protrusion 20. The second protrusion 22 extends parallel to other opposing sides 21, which are disposed on the other sides of the rectangular planar portion 14, over the whole other opposing sides 21. The second protrusion 22 is separated from the adjacent other opposing side 21 at a predetermined interval. The second protrusion 22 intersects with the first protrusions 20. More specifically, the second protrusions 22 couple the peripheral wall 12 with the adjacent inclined vertical wall 26 of the first protrusions 20 and couple the adjacent two inclined vertical walls 26 of the two first protrusions 20 with one another. As illustrated in FIG. 2, the second protrusion 22 is configured by forming a long shallow groove 23 extending from the one plate surface 17 to the other plate surface 19 of the rectangular planar portion 14 similarly to the first protrusions 20. As illustrated in FIG. 4, the second protrusions 22 include a pair of inclined vertical walls 25 facing one another and a top wall 27, which couples tops of the inclined vertical walls 25 with one another. The pair of inclined vertical walls 25 facing one another is inclined at a predetermined inclination angle such that the pair of inclined vertical walls 25 comes close to one another as approaching from the rectangular planar portion 14 to the top wall 27. The second protrusion 22 has a cross-sectional surface with a trapezoidal shape perpendicular to the extending direction of the second protrusions 22. The top wall 27 has a rectangular shape.

The top wall 27 has a top surface that has a lower height than that of the top surface of the projecting flange 16. The top wall 27 is coupled at a root portion of the first protrusion 20. This prevents the inclined vertical wall 26 of the first protrusion 20 from falling down especially in the case where an impact load is obliquely applied to the rectangular planar portion 14. This ensures a sufficient deformation stroke of the inclined vertical wall 26.

Figure 5:
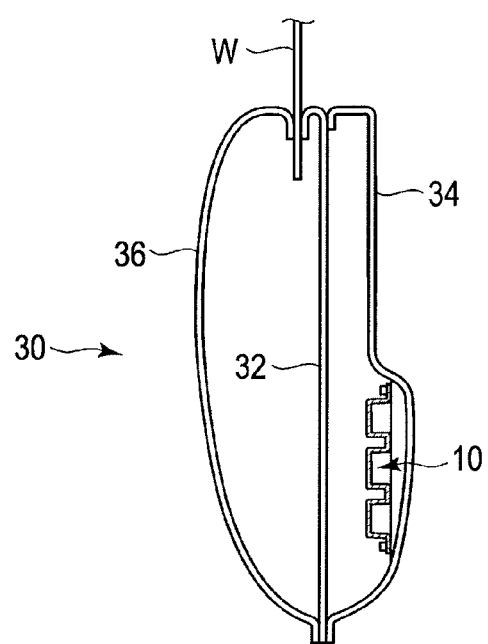
FIG. 5 is a schematic cross-sectional view illustrating the impact energy absorber according to the embodiment installed inside a door panel.

As illustrated in FIG. 5, the impact energy absorber for vehicle 10 is installed at a door panel 30. More specifically, the impact energy absorber for vehicle 10 is secured to a door trim 34 in a hollow portion between an inner panel 32 and the door trim 34. The impact energy absorber for vehicle 10 is secured to the door trim 34 with a clip (not shown) via the installation portion 18 of the projecting flange 16. This allows a shoulder portion or a waist portion of a vehicle occupant to be brought into contact with a plate surface side (backside surface side) of the impact energy absorber for vehicle 10 via the door trim 34 when vehicle side collision occurs. This crushes the impact energy absorber for vehicle 10, thus reducing stress applied to the vehicle occupant.

Figure 6:
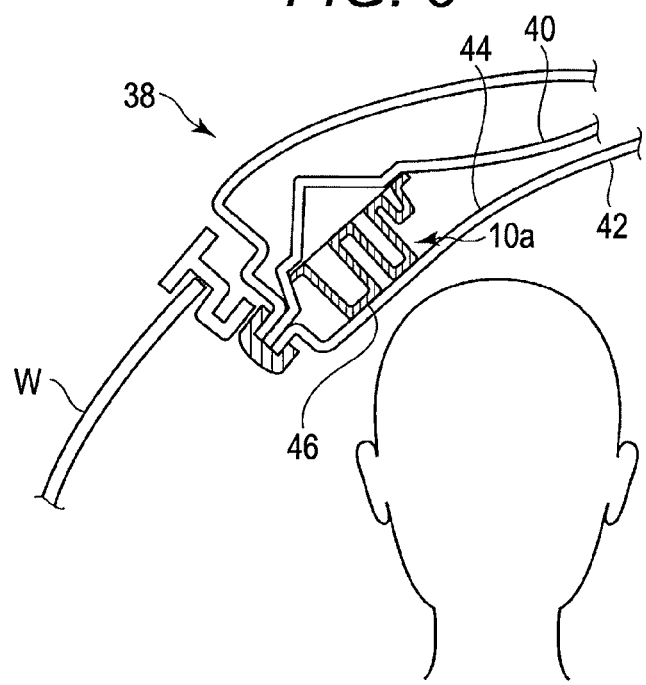
FIG. 6 is a schematic cross-sectional view illustrating the impact energy absorber according to the embodiment installed inside a ceiling panel.

FIG. 6 illustrates a modification of the impact energy absorber for vehicle 10. As illustrated in FIG. 6, an impact energy absorber for vehicle 10a according to the modification is installed at a ceiling panel 38. The impact energy absorber for vehicle 10a is secured to a roof trim 42 in a hollow portion between an inner panel 40 and the roof trim 42. The impact energy absorber for vehicle 10a is secured to an inner surface 44 of the roof trim 42 at a top surface 46 of the top wall 28 of the impact energy absorber for vehicle 10a by bonding with hot melt adhesive. This allows the head of a vehicle occupant to be brought into contact with a plate surface side (front surface side) of the impact energy absorber for vehicle 10a via the roof trim 42 when vehicle side collision occurs, thus protecting the head of the vehicle occupant.

Next, by referring to FIGS. 8 to 12, the method for forming the impact energy absorber for vehicle 10 will be described.

Figure 8:
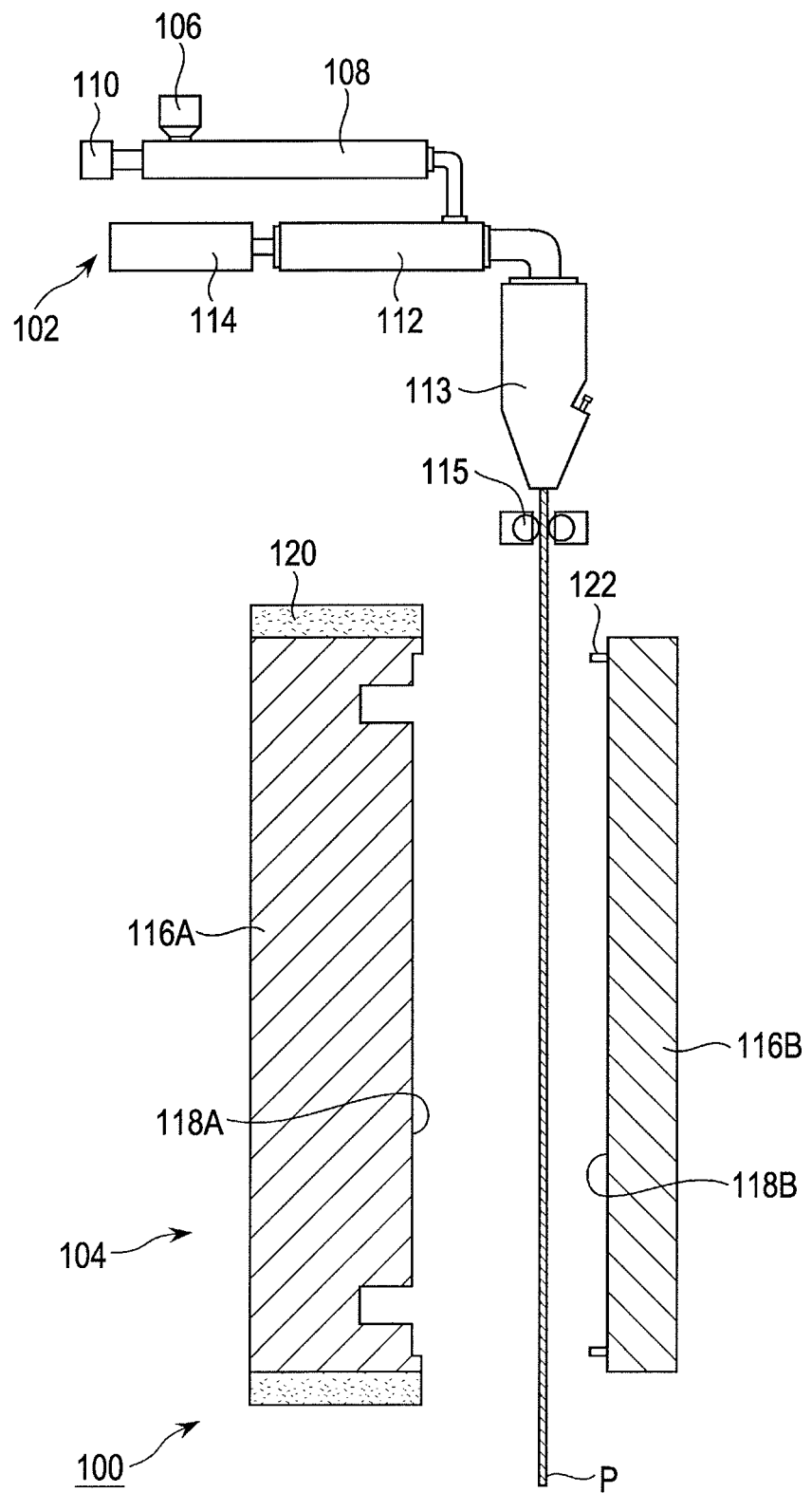
FIG. 8 is a schematic diagram illustrating split mold blocks opened in a forming process to form the impact energy absorber according to the embodiment.

As illustrated in FIG. 8, a forming apparatus 100 for the impact energy absorber for vehicle 10 includes an extruding machine 102 for molten resin and a clamping machine 104 of molds 116A and 116B, which is disposed below the extruding machine 102. The forming apparatus 100 introduces molten thermoplastic resin, which is extruded from the extruding machine 102, to the clamping machine 104, thus forming the molten thermoplastic resin at the clamping machine 104.

The extruding machine 102 includes a cylinder 108 with a hopper 106, a screw (not shown) inside the cylinder 108, a hydraulic motor 110 coupled to the screw, an accumulator 112, which is coupled to the cylinder 108 inside, and a plunger 114 inside the accumulator 112. Resin pellets charged from the hopper 106 are melted and mixed inside the cylinder 108 by rotation of the screw by the hydraulic motor 110. The molten resin is introduced to an accumulator chamber and then accumulated in a certain amount. The molten resin is introduced to a T-die 113 by drive of the plunger 114. The molten resin is extruded through an extrusion slit (not shown) as a continuous thermoplastic resin sheet P. The thermoplastic resin sheet P is introduced downward while being pressed with a pair of rollers 115 disposed at a predetermined distance. The thermoplastic resin sheet P is suspended between the split mold blocks 116A and 116B. This locates the thermoplastic resin sheet P being tensioned without wrinkle and sagging between the split mold blocks 116A and 116B.

The extrusion slit (not shown) is disposed below the T-die 113 facing a vertically downward direction. The thermoplastic resin sheet P, which is extruded from the extrusion slit, is introduced to the vertically downward direction while being suspended from the extrusion slit. The extrusion slit may have a changeable slit width. This allows setting a thickness of the thermoplastic resin sheet P to a desired one. In view of this, the extrusion slit locates the thermoplastic resin sheet P with a desired thickness between the split mold blocks 116A and 116B.

On the other hand, the clamping machine 104 includes two split mold blocks 116A and 116B and a mold driving device (not shown). The mold driving device moves the split mold blocks 116A and 116B between an opening position and a closed position in a direction approximately perpendicular to a supplying direction of the molten thermoplastic resin sheet P.

The two split mold blocks 116A and 116B respectively have cavities 118A and 118B and are disposed such that the cavities 118A and 118B face one another. The cavities 118A and 118B are disposed to face the approximately vertical direction. The cavities 118A and 118B have concavo-convex portions on their surfaces. The concavo-convex portions correspond to an outer shape and a surface shape of the impact energy absorber for vehicle 10, which is formed from the molten thermoplastic resin sheet P.

The mold 116B includes a pinch-off portion 122 around the cavity 118B. The pinch-off portion 122 is formed around the cavity 118B in a circular pattern and projected toward the mold 116A, which faces the mold 116B. This brings a distal end portion of the pinch-off portion 122 at the mold 116B into contact with the mold 116A when the two split mold blocks 116A and 116B are clamped.

The mold driving device drives each of the two split mold blocks 116A and 116B. When the two split mold blocks 116A and 116B are at the open position, the molten thermoplastic resin sheet P is allowed to be disposed between the two split mold blocks 116A and 116B. When the two split mold blocks 116A and 116B are at the close position, the circular pinch-off portion 122 of the split mold block 116B is brought into contact with the mold 116A so as to form a hermetic space between the two split mold blocks 116A and 116B.

A frame 120 slidably fits an outer periphery portion of the split mold block 116A from the outer side of the split mold block 116A. A frame moving device (not shown) moves the frame 120 relative to the split mold block 116A. More specifically, the frame 120 projects from the mold 116A toward the mold 116B. This brings the frame 120 into contact with one side face of the thermoplastic resin sheet P, which is located between the molds 116A and 116B.

The split mold block 116A includes a vacuum suction chamber (not shown) inside. The vacuum suction chamber communicates with the cavity 118A through a suction hole (not shown). Suction of the vacuum suction chamber through the suction hole sucks the thermoplastic resin sheet P to the cavity 118A, thus forming a shape along the outer surface of the cavity 118A.

Figure 13:
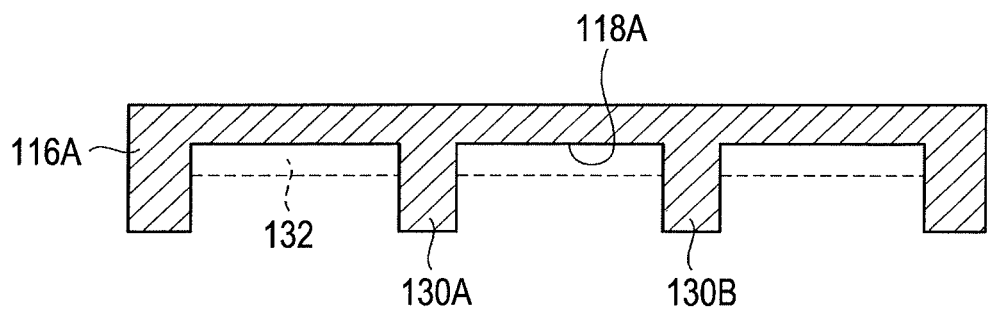
FIG. 13 is a schematic lateral sectional view illustrating the cavity of the split mold blocks to form the impact energy absorber according to the embodiment.

FIG. 13 is a schematic lateral sectional view illustrating the cavity 118A of the two split mold blocks 116A and 116B. As illustrated in FIG. 13, the cavity 118A includes, on its outer surface, a plurality of first slender protrusions 130A and 130B and a plurality of second slender protrusions 132. The first slender protrusions 130A and 130B each extend in a vertical direction and are separated at a predetermined interval. The second slender protrusions 132 extend perpendicularly intersecting with the plurality of first slender protrusions 130A and 130B and are separated at a predetermined interval. The plurality of first slender protrusions 130A and 130B has a height from the outer surface of the cavity 118A, which height is higher than heights of the plurality of second slender protrusions 132 from the outer surface of the cavity 118A.

The split mold blocks 116A and 116B include a blow pin (not shown). The blow pin is used to apply blow pressure to a hermetic space that is formed by the molds 116A and 116B when the molds 116A and 116B are clamped.

A method for forming the impact energy absorber for vehicle 10 using the forming apparatus 100 for the impact energy absorber for vehicle 10 thus configured will be described.

First, as illustrated in FIG. 8, the extrusion slit (not shown) of the T-die 113 intermittently extrudes the accumulated thermoplastic resin at a predetermined rate of extrusion amount per unit time. The molten thermoplastic resin swells, and is extruded with a predetermined thickness at a predetermined extrusion rate. The thermoplastic resin is suspended downward as the molten thermoplastic resin sheet P. The thermoplastic resin sheet P is then located between the split mold blocks 116A and 116B. In this case, the thermoplastic resin sheet P may be formed, for example, by passing a cylindrical parison between the pair of rollers 115 before forming and after extruding. This flattens out the cylindrical parison into a sheet shape.

In this case, it is possible to set the thickness of the thermoplastic resin sheet P at a desired thickness. This thickness can be independently set by adjusting a slit width of the extrusion slit opening or by adjusting a distance between the pair of rollers 115.

Figure 9:
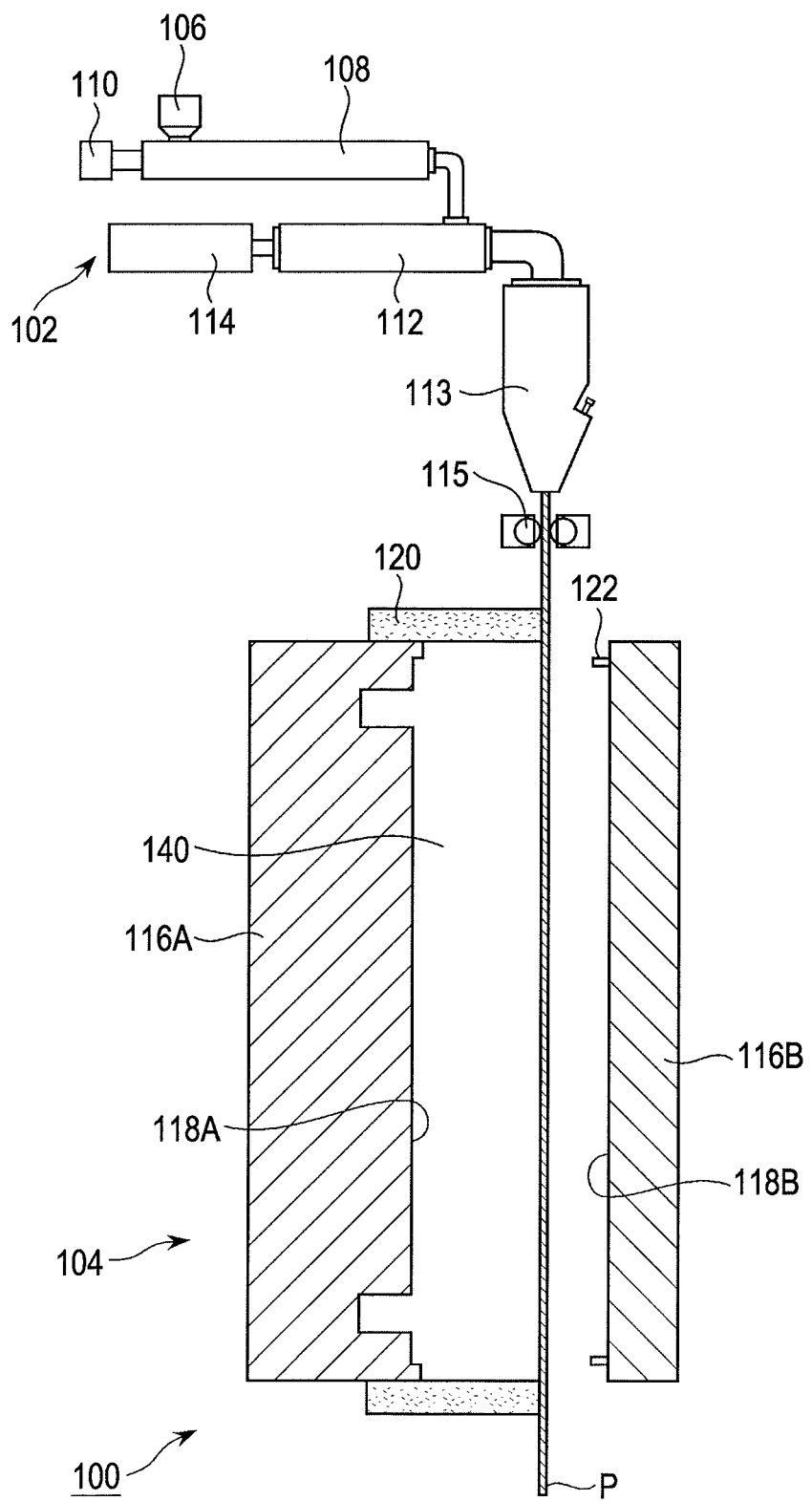
FIG. 9 is a schematic diagram illustrating a hermetic space formed between a cavity and a thermoplastic resin sheet in the forming process to form the impact energy absorber according to the embodiment.

Next, as illustrated in FIG. 9, the frame moving device (not shown) moves the frame 120 of the split mold block 116A from the split mold block 116A toward the thermoplastic resin sheet P, thus bringing the frame 120 into contact with a side face of the thermoplastic resin sheet P. This forms a hermetic space 140 with the side face of the thermoplastic resin sheet P, an inner circumferential surface of the frame 120, and the cavity 118A.

Figure 10:
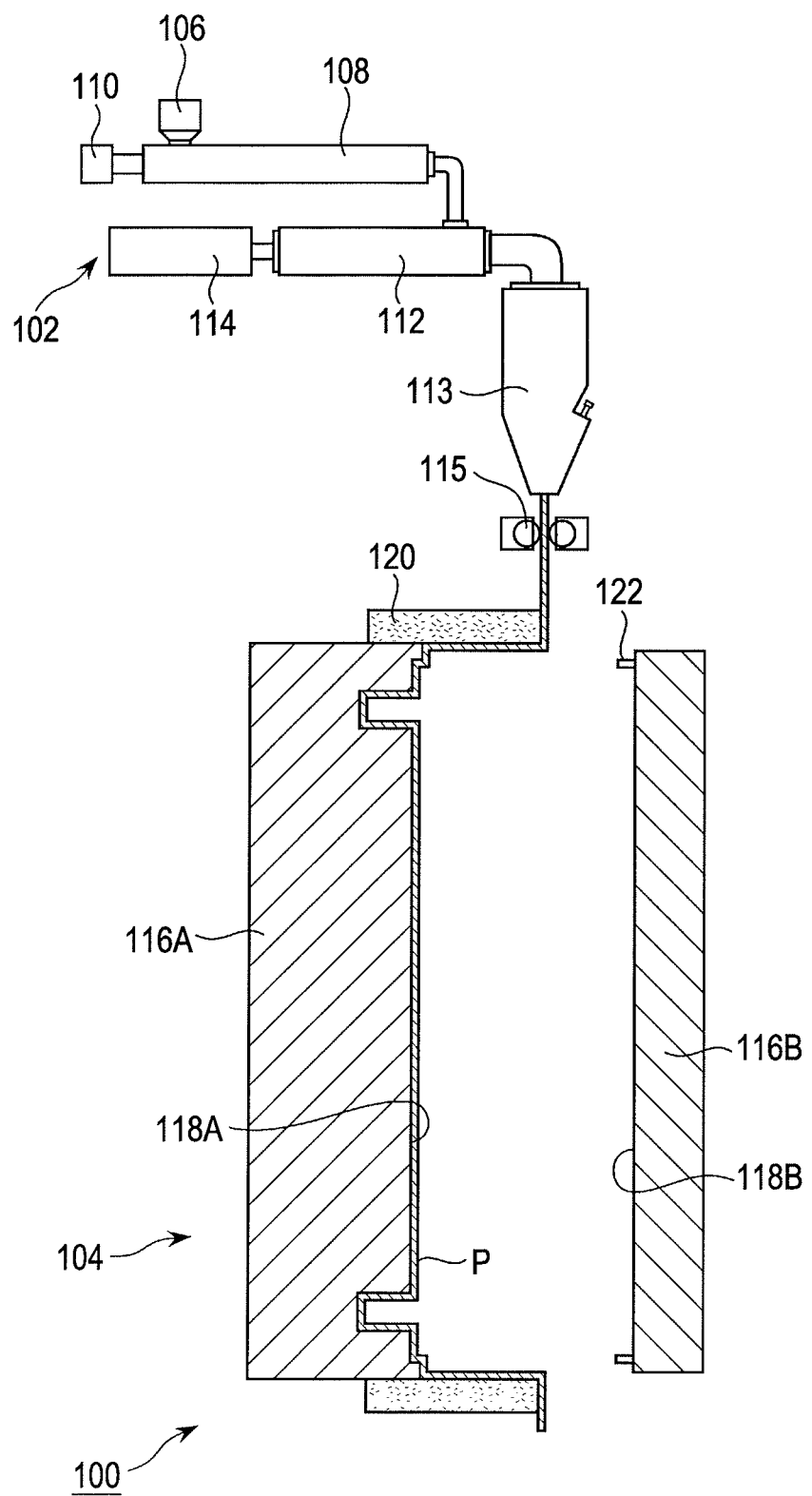
FIG. 10 is a schematic diagram illustrating the thermoplastic resin sheet formed by reducing pressure in the forming process to form the impact energy absorber according to the embodiment.

Next, as illustrated in FIG. 10, air in the hermetic space 140 is sucked through the suction hole by the vacuum suction chamber. Accordingly, the thermoplastic resin sheet P is sucked to the cavity 118A and formed in a shape along the surface of the cavity 118A. More specifically, the first protrusions 130A and 130B and the second protrusion 132 of the cavity 118A (see FIG. 13) form long grooves from a surface of the thermoplastic resin sheet P facing the cavity 118A toward a surface of the cavity 118A side. The long grooves have a shape complementary to the first protrusions 130A and 130B and the second protrusion 132. This forms the first protrusions 20, the second protrusions 22, and the peripheral wall 12 (see FIG. 1) on the surface of the cavity 118A.

Figure 11:
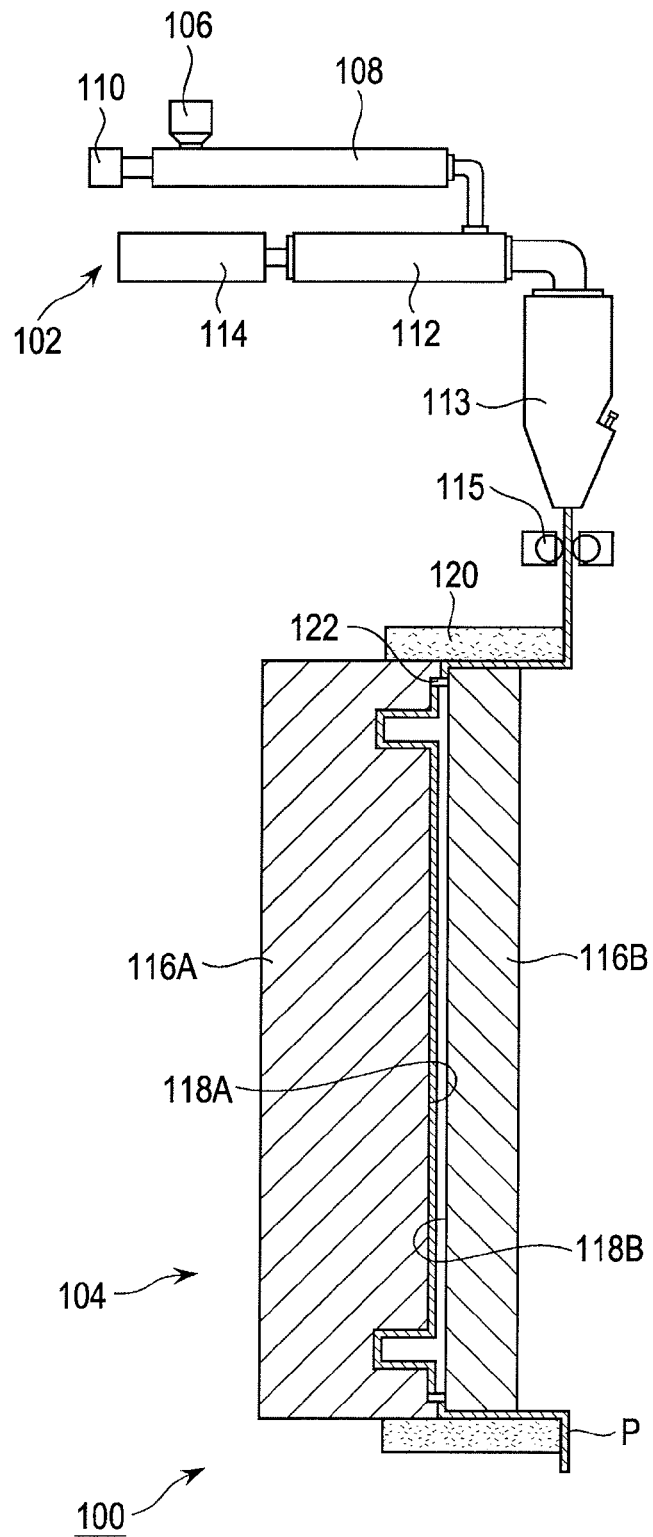
FIG. 11 is a schematic diagram illustrating the split mold blocks clamped in the forming process to form the impact energy absorber according to the embodiment.

Next, as illustrated in FIG. 11, the split mold blocks 116A and 116B are clamped. The pinch-off portion 122 of the split mold block 116B defines a frame of a peripheral edge portion of the thermoplastic resin sheet P.

Figure 12:
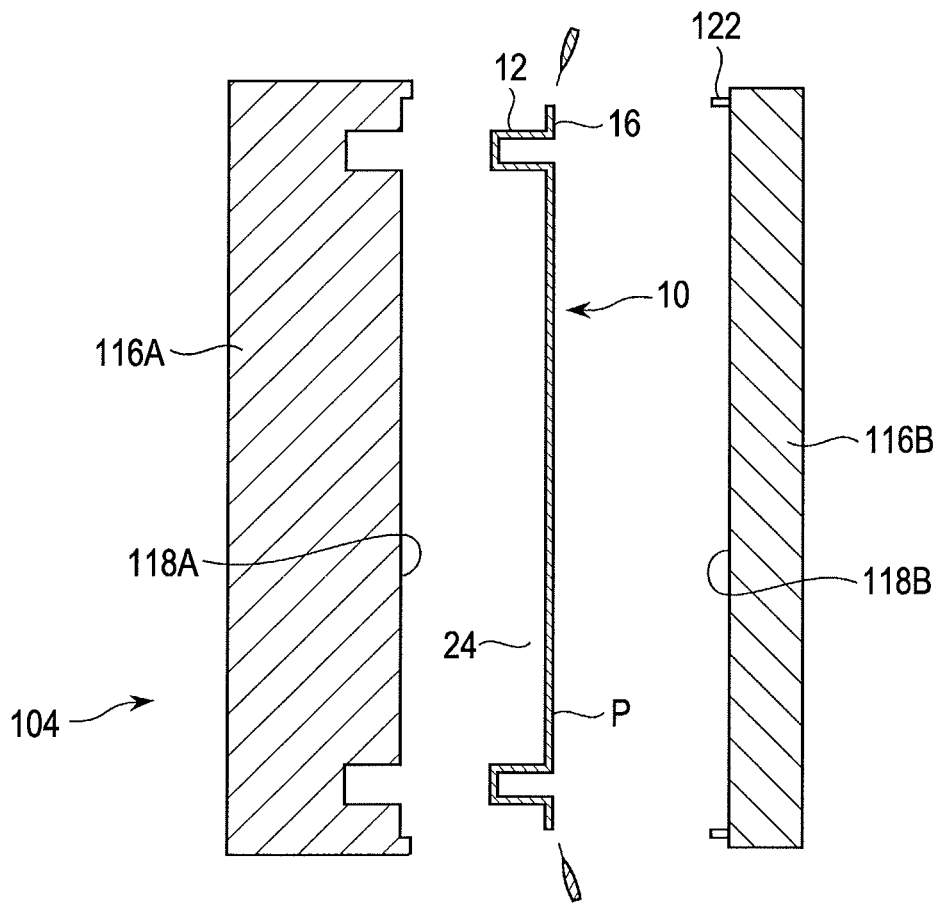
FIG. 12 is a schematic diagram illustrating the impact energy absorber taken out by opening the split mold blocks in the forming process to form the impact energy absorber according to the embodiment.

Next, as illustrated in FIG. 12, the split mold blocks 116A and 116B are opened, and the formed resin product is taken out. Burrs are removed from the resin product on its outer periphery portion, and then the impact energy absorber 10 is completed.

As described above, these processes are repeated each time the molten thermoplastic resin is extruded intermittently. This ensures an effective production of the impact energy absorber 10 one after another. That is, the extrusion forming ensures extruding the molten thermoplastic resin sheet intermittently, and forming the extruded thermoplastic resin sheet in a predetermined shape using the molds 116A and 116B.

The above-described method for forming a resin impact energy absorber for vehicle allows forming the following resin impact energy absorber for vehicle different from a conventional configuration that absorbs impact energy with grid-shaped ribs formed by the injection forming method. This resin impact energy absorber for vehicle receives an impact load using long-groove-shaped simple protrusions on the planar portion. This prevents the protrusions from falling down while keeping thin protrusions even in the case where the impact load is obliquely applied. This results in ensuring a deformation stroke. On the other hand, in the case where an impact load is locally applied, decreasing the grid width of the grid-shaped ribs causes a bottoming of the ribs. In contrast to this, this resin impact energy absorber for vehicle reduces a possibility of such bottoming and ensures a deformation stroke. The forming method forms a resin energy absorber that has: a low-cost, lightweight, and simplified structure; and a good energy-absorbing property, with a good formability.

A double-wall structure, which is formed by blow forming, has a thin thickness of vertical walls (impact absorbing ribs) as a whole. This makes it difficult to ensure an impact absorbing amount by crushing while reducing weight of the impact absorber. In contrast, the resin impact energy absorber according to the embodiment has a single wall structure that ensures a thickness of a vertical wall. This ensures an impact absorbing stroke when compressing the whole surface even in the case where the whole resin amount is reduced.

A forming procedure is not limited to the above-described procedure for forming resin material by forming the hermetic space between the cavity 118A and the resin material before clamping the split mold blocks 116A and 116B, and then sucking the resin material from the cavity 118A side. For example, resin material may be formed by clamping the split mold blocks 116A and 116B so as to form the hermetic space between the split mold blocks 116A and 116B, and then applying blow pressure from the hermetic space. With this method, forming by sucking and blow pressure ensures good formability even in the case where a complicated shape is formed. Further, when the split mold blocks 116A and 116E are clamped, resin material may be formed by applying blow pressure from the hermetic space while sucking resin material from the cavity 118A side. This method applies blow pressure while removing air accumulated in a recess of the cavity 118A by sucking, thus ensuring good formability.

The inventor has tested the impact energy absorber according to the embodiment to evaluate its impact energy-absorbing property in the following manner.

(1) Testing Method
(i) The test was carried out using an impact-testing machine made by Hodogaya Giken Corporation. The impact-testing machine includes, on its distal portion, a load acting surface with a diameter of 60 mm. In the test, an impact probe with a weight of 20 kg collided with the impact energy absorber at a speed of 20 km per hour, for calculating impact energy at a compressive strain of 70%.

(ii) Testing Parameter
The testing parameter includes, firstly, types of structure of the impact energy absorber, secondly, types of rib that receives impact load, thirdly, a top wall width of a slit-shaped rib (long deep groove formed with the first protrusion), and fourthly, existence of the long shallow groove (long shallow groove formed with the second protrusion) in the slit-shaped rib (long deep groove formed with the first protrusions). The types of the structure of the impact energy absorber include the single wall structure and the hollow wall structure with opposed walls. The types of rib that receives impact load include the truncated-cone-shaped rib and the slit-shaped rib (long deep groove formed with the first protrusion). In view of this, Case 1 to Case 5 are set as illustrated in FIG. 15.

Case 5 corresponds to the impact energy absorber according to the embodiment.

(iii) As illustrated in FIG. 15, Case 1 to Case 5 were each tested for: a wholly uniform impact load; a local impact load; and an oblique impact load as loading methods of the impact load with the impact probe. The oblique impact load is applied from an inclined direction at 30 degrees with respect to almost the whole inner side of the peripheral wall.

(2) Testing Condition

1. Specifications of the impact energy absorber in Cases 3 to 5 are follows. Specifications other than the top wall width and the second protrusion are common in Cases 3 to 5.
(A) Material: polypropylene
(B) Thickness: 1.9 mm
(C) Size: 310 mm Height×210 mm Width
First Protrusion
   Number: 2
   Protrusion height: 40 mm
   Distance between adjacent protrusions: 60 mm
   Width of top wall: 5 mm (Case 3) or 10 mm (Case 4)
   Length of top wall: 290 mm
   Inclination angle of the inclined vertical wall: 3 degrees
Second Protrusion
   Number: 2 (Case 5)
   Protrusion height: 10 mm
   Distance between adjacent protrusions: 85 mm
   Width of top wall: 3 mm
   Length of top wall: 210 mm as a whole
   Length of top wall between the peripheral wall and the adjacent inclined vertical wall of the first protrusion: 70 mm
   Length of top wall between the adjacent inclined vertical walls of the first protrusions: 50 mm
   Inclination angle of the inclined vertical wall: 3 degrees 2. Method for Applying Impact Load An impact load was applied to a front surface side (one plate surface side) that has an opening side of the long groove formed with the first protrusions and the second protrusion of the impact energy absorber.

(3) Test Results

Figure 7:
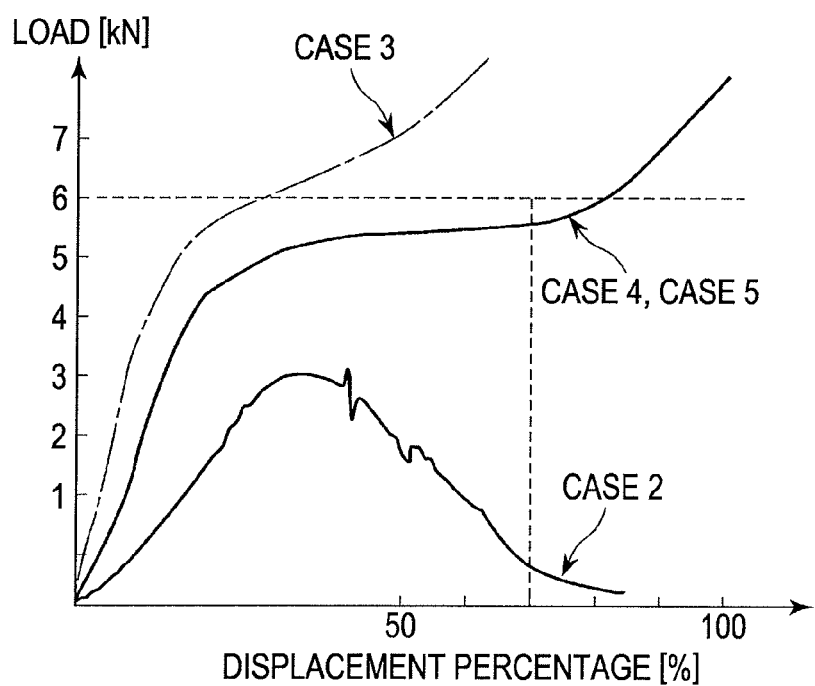
FIG. 7 is a graph illustrating a result of an impact loading test using the impact energy absorber according to the embodiment where displacement percentage is on the horizontal axis, and load is on the vertical axis.

FIGS. 7 and 15 show test results. FIG. 15 illustrates absorbed energies when respective impact energy absorbers are crushed to a compressive strain of 70% within a range where the impact load does not exceed 6 kN.

(i) As illustrated in FIG. 7, Case 4 and Case 5, which are different from Case 3, restrict a rapid increase in the impact load until displacement percentage reaches 70%. On the other hand, Case 4 and Case 5, which are different from Case 2, also restrict a rapid decrease in the impact load until displacement percentage reaches 70%.

(ii) As illustrated in FIG. 15, Case 2 to Case 5 where weight and thickness are approximately the same do not have a significant difference in the impact energy-absorbing property at compressing the whole surface. There is no significant difference in the impact energy-absorbing property between the hollow wall structure of Case 1 and each of the single wall structures of Case 2 to Case 5 when compressing the whole surface.

(iii) Among Case 2 to Case 5, Case 5 (the slit rib in the long deep groove shape) has the best impact energy-absorbing property for a local impact load, Case 2 (the truncated-cone-shaped rib) has the worst impact energy-absorbing property, and Cases 4 and 5 (the slit rib in the long deep groove shape) do not have a significant difference from one another. This is because the slit rib in the long deep groove shape has better integrity of the ribs than the truncated-cone-shaped rib, which leads to smaller local variation in impact energy-absorbing property. Further, the comparison of Case 3 with Case 4 has demonstrated that the top wall width affects the impact energy-absorbing property for the local impact load.

(iv) The comparison of Case 4 with Case 5 has demonstrated that the impact energy-absorbing property for the impact load from an oblique direction is better in Case 5. The inventor assumed as follows. The second protrusion in the long shallow groove shape couples the inclined vertical walls of the adjacent first protrusions with one another. This prevents the inclined vertical wall falling down when the impact load is obliquely applied. This ensures a deformation stroke that absorbs impact energy.

(v) The comparison of Case 1 with Case 5 has demonstrated that there is no significant local variation in impact energy-absorbing property among respective cases of applying a wholly uniform impact load, a local impact load, and an oblique impact load. This shows that the single wall structure has an advantage in ensuring a lightweight impact energy absorber compared with the hollow wall structure.

Figure 14A:
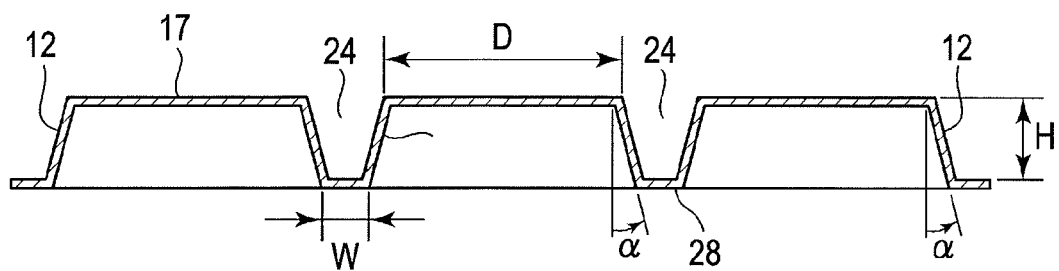
FIGS. 14A, 14B, and 14C are schematic cross-sectional views illustrating the impact energy absorber according to the embodiment before and after the deformation.
Figure 14B:
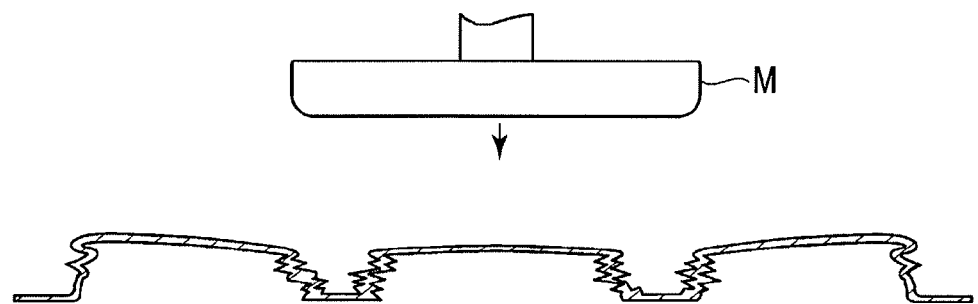
Figure 14C:
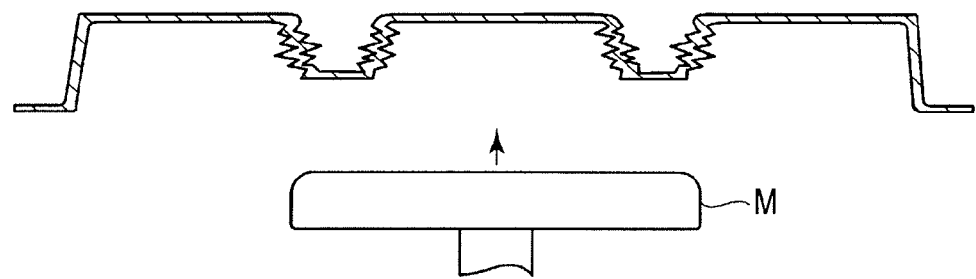

As illustrated in FIG. 14 (in the case of local load), in the resin impact energy absorber for vehicle 10 configured as described above, the first protrusions 20 independently deform when the impact load is applied to one plate surface or the other plate surface of the planar portion 14. This reduces an increase in a repulsion force in response to the impact load. The first protrusion 20 forms the long deep groove 24 from the one plate surface to the other plate surface. The long deep groove 24 includes the pair of inclined vertical walls 26 facing one another, and a top wall 28 that couples tops of the respective inclined vertical walls 26 at approximately the same height as the peripheral wall 12. The inclined vertical walls 26 are inclined at a predetermined inclination angle α such that the inclined vertical walls 26 come close one another as approaching from the planar portion 14 to the top wall 28. The inclination reduces the impact load received by the top wall 28 and the respective inclined vertical walls 26 of the plurality of first protrusions 20 in the case where the impact load is applied in a direction approximately perpendicular to the planar portion 14. This reduces bottoming of the top wall 28 against the planar portion 14 and ensures a sufficient absorption stroke of the impact energy. The second protrusion 22 couples the inclined vertical walls 26 of the adjacent first protrusions 20 with one another and couples the peripheral wall 12 with the inclined vertical wall 26. This prevents the inclined vertical wall 26 from falling down even in the case where the impact load is obliquely applied. This ensures the sufficient absorption stroke of the impact energy. The resin impact energy absorber for vehicle 10 ensures a sufficient deformation stroke not only in the case where a uniform impact load is applied to the whole energy absorber but also in the case where the impact is obliquely applied. Further, this reduces local variation in energy-absorbing property.

It will be appreciated that the present disclosure will not be limited to the embodiment described above, but various modifications and changes are possible by one of ordinary skill in the art without departing from the technical scope of the present disclosure.

For example, while in the embodiment, the second protrusion 22, which couples the inclined vertical walls 26 of the adjacent first protrusions 20 with one another, is described as a member disposed in a straight line perpendicular to the extending direction of the first protrusion 20 and intersecting with all the first protrusions 20 for convenience in forming. This, however, should not be construed in a limiting sense. Specifically, the second protrusion 22 of the present disclosure is not necessarily disposed in a straight line to intersect with all the first protrusions 20 insofar as the second protrusion 22 is coupled at a root portion of the inclined vertical walls 26 and prevents the inclined vertical walls 26 from falling down in the case where the impact load is obliquely applied. For example, one second protrusion 22 that couples the inclined vertical walls 26 of the adjacent first protrusions 20 in a line with one another, and the other second protrusion 22 that couples the inclined vertical walls 26 of the adjacent first protrusions 20 in the next line with one another may be disposed while shifted in the extending direction of the first protrusion 20.

In the embodiment, the thermoplastic resin sheet is extruded downward in a molten state and located between the pair of split mold blocks 116A and 116B. This, however, should not be construed in a limiting sense. For example, a thermoplastic resin sheet that is preliminarily formed may be reheated so as to be in a molten state and then located between the pair of split mold blocks 116A and 116B.

The resin impact energy absorber for vehicle according to the present disclosure may be configured as follows. For example, the resin impact energy absorber having a single wall solid plate structure includes a peripheral wall, a planar portion surrounded by the peripheral wall, a plurality of first protrusions, and a second protrusion. The first protrusion is formed by forming a plurality of first long grooves parallel to one another at the predetermined interval in the planar portion. The second protrusion extends in a direction intersecting with the plurality of first protrusions in the planar portion. The second protrusion is formed by forming a second long groove in the planar portion. The first protrusion includes a pair of inclined vertical walls and a top wall. The pair of inclined vertical walls projects from the planar portion. The inclined vertical walls face one another. The top wall couples tops of the pair of inclined vertical walls with one another at approximately the same height as the peripheral wall. The pair of inclined vertical walls is inclined at a predetermined inclination angle such that the pair of inclined vertical walls comes close to one another as approaching from the planar portion to the top wall. The second protrusion couples the peripheral wall with the inclined vertical wall of the first protrusion closest to the peripheral wall, and couples the inclined vertical walls of the adjacent first protrusions with one another. The second protrusion has a protrusion height lower than a protrusion height of the plurality of first protrusions. The second protrusion is coupled with the first protrusions at root portions. The planar portion includes one plate surface and another plate surface. At least one of the one plate surface and the other plate surface includes an impact load receiving surface.

The resin impact energy absorber having a single wall solid plate structure may include a peripheral wall, a planar portion surrounded by the peripheral wall, and a plurality of first protrusions. The first protrusions are parallel to one another at a predetermined interval in the planar portion. The plurality of first protrusions is formed by forming a plurality of long grooves along a mold cavity from one surface to the other surface. The plurality of long grooves is formed by at least one of vacuuming and pressing. The vacuuming includes vacuuming the molten thermoplastic resin sheet from the one surface. The pressing includes pressing the molten thermoplastic resin sheet from the other surface. The first protrusion includes a pair of inclined vertical walls and a top wall. The pair of inclined vertical walls projects from the planar portion. The inclined vertical walls face one another. The top wall couples tops of the pair of inclined vertical walls with one another at approximately the same height as the peripheral wall. The pair of inclined vertical walls is inclined at a predetermined inclination angle such that the pair of inclined vertical walls comes close to one another as approaching from the planar portion to the top wall. The first protrusion has the top wall with a width of 8 to 25 mm. The planar portion includes one plate surface and another plate surface. At least one of the one plate surface and the other plate surface includes an impact load receiving surface.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for forming a resin impact energy absorber for vehicle, the method comprising:

providing a pair of split mold blocks, one of which having a mold cavity and either one or both of which having a pinch-off portion, the mold cavity being provided, on a surface of the mold cavity, with a plurality of either first long grooves or first slender protrusions to form first protrusions of the resin impact energy absorber, and a plurality of either second long grooves or second slender protrusions to form second protrusions of the resin impact energy absorber, perpendicularly intersecting with the plurality of either the first long grooves or the first slender protrusions;

forming the pinch-off portion either or both around the mold cavity in a circular pattern, projecting the pinch-off portion toward another one of the pair of split mold blocks, when the pinch-off portion is provided with the one of the pair of split mold blocks having the mold cavity, and in a circular pattern in relation to the mold cavity, projecting the pinch-off portion toward the one of the pair of split mold blocks having the mold cavity, when the pinch-off portion is provided with the another one of the pair of split mold blocks without the mold cavity;

locating a molten thermoplastic resin sheet extruded through an extrusion slit and introduced downward while pressed with a pair of rollers provided at a predetermined distance, the molten thermoplastic sheet provided to face the mold cavity such that the molten thermoplastic resin sheet has an outer border outside the mold cavity;

forming a hermetic space between the mold cavity and a surface of the thermoplastic resin sheet that faces the mold cavity;

forming by vacuuming the thermoplastic resin sheet through the hermetic space so as to press the thermoplastic resin sheet against the mold cavity, clamping the thermoplastic resin sheet by the pair of split mold blocks by either or both bringing the pinch-off portion of the one of the pair of split mold blocks in contact with the another one of the pair of split mold blocks when the pinch-off portion is provided with the one of the pair of split mold blocks having the mold cavity, and bringing the pinch-off portion of the another one of the pair of split mold blocks in contact with the one of the pair of split mold blocks when the pinch-off portion is provided with the another one of the pair of split mold blocks without the mold cavity, wherein the method forms the first and second protrusions of the resin impact energy absorber having complementary shapes to either the first and second long grooves, or the first and second slender protrusions, respectively, by having the thermoplastic resin sheet sucked to the first and second protrusions of the mold cavity to form the thermoplastic resin sheet in a shape along the surface of the mold cavity, the second protrusions of the resin impact energy absorber extend in a straight line parallel to a pair of opposing sides of the resin impact energy absorber so as to couple another pair of opposing sides of the resin impact energy absorber with one another, the first protrusions of the resin impact energy absorber extend parallel to the another pair of opposing sides without coupling the pair of opposing sides, and the method forms the first protrusion of the resin impact energy absorber having a height higher than a height of the second protrusion of the resin impact energy absorber, a length longer than a length of the second protrusion of the resin impact energy absorber, and a width wider that a width of the second protrusion of the resin impact energy absorber.

2. The method for forming a resin impact energy absorber for vehicle according to claim 1, wherein the mold cavity includes a planar portion including:
the plurality of first slender grooves to form the plurality of first protrusions of the resin impact energy absorber, disposed at a first predetermined interval; and
the plurality of second slender grooves to form the plurality of second protrusions of the resin impact energy absorber, which extend perpendicularly intersecting with the plurality of first slender grooves, the plurality of second slender grooves being disposed at a second predetermined interval, and
the plurality of first slender grooves have a protrusion height from the planar portion higher than a protrusion height of the plurality of second slender grooves from the planar portion, a protrusion length longer than a protrusion length of the plurality of second slender grooves, and a protrusion width wider than a protrusion width of the plurality of second slender grooves.

3. The method for forming a resin impact energy absorber for vehicle according to claim 1, wherein
at least one of the first and second long grooves of the mold cavity has a cross-sectional surface with a trapezoidal shape perpendicular to an extending direction of the long groove.

4. The method for forming a resin impact energy absorber for vehicle according to claim 1, wherein
at least one of the first and second long grooves of the mold cavity includes a pair of inclined vertical walls inclined at a predetermined inclination angle and facing one another.

5. The method for forming a resin impact energy absorber for vehicle according to claim 1, wherein
at least one of the first and second long grooves of the mold cavity includes a top wall that couples tops of the pair of inclined vertical walls, the top wall having a width of 8 to 25 mm.

6. The method for forming a resin impact energy absorber for vehicle according to claim 1, wherein,
in the clamping, the thermoplastic resin sheet is clamped by the pair of split mold blocks for removing burrs of the thermoplastic resin sheet.

7. The method for forming a resin impact energy absorber for vehicle according to claim 6, further comprising,
opening the pair of split mold blocks, taking the thermoplastic resin sheet out from the pair of split mold blocks, and removing the burrs of the thermoplastic resin sheet.

8. A method for forming a resin impact energy absorber for vehicle, the method comprising:

extruding a molten thermoplastic resin sheet in a vertically downward direction through an extrusion die, while pressing the molten thermoplastic resin sheet with a pair of rollers provided at a predetermined distance, to supply the molten thermoplastic resin sheet, the extrusion die being vertically located above a pair of split mold blocks;

providing a surface of one of the split mold blocks with a mold cavity and providing either one or both of the split mold blocks with a pinch-off portion;

providing the mold cavity with a plurality of either first long grooves or first slender protrusions, and a plurality of either a second long grooves or second slender protrusions, perpendicularly intersecting with either the plurality of the first long grooves or the first slender protrusions;

forming the pinch-off portion either or both around the mold cavity in a circular pattern when the pinch-off portion is provided with the one of of the pair of split mold blocks provided with the mold cavity, and in a circular pattern in relation to the mold cavity when the pinch-off portion is provided with another one of the pair of split mold blocks without the mold cavity;

positioning the thermoplastic resin sheet between the pair of split mold blocks such that the molten thermoplastic resin sheet has an outer border outside the mold cavity;

forming a hermetic space between the mold cavity and a surface of the thermoplastic resin sheet that faces the mold cavity;

forming the thermoplastic resin sheet in the hermetic space by at least one of pressing and vacuuming;

forming a first protrusion and a second protrusion of the resin impact energy absorber, perpendicularly intersecting with each other, each having a complementary shape to the first long grooves and the second long grooves, respectively, or a complementary shape to the first slender protrusions or the second slender protrusions, respectively, by projecting the first and second protrusions of the resin impact energy absorber from the surface of the thermoplastic resin sheet toward the mold cavity; and clamping the thermoplastic resin sheet by the pair of split mold blocks by either or both bringing the pinch-off portion of the one of the pair of split mold blocks in contact with the another one of the pair of split mold blocks when the pinch-off portion is provided with the one of the pair of split mold blocks having the mold cavity, and bringing the pinch-off portion of the another one of the pair of split mold blocks in contact with the one of the pair of split mold blocks when the pinch-off portion is provided with the another one of the pair of split mold blocks without the mold cavity, wherein the pressing in the forming the thermoplastic resin sheet in the hermetic space includes pressing a hermetic space, the vacuuming in the forming the thermoplastic resin sheet in the hermetic space includes vacuuming inside the hermetic space, and the forming the first protrusion and the second protrusion forms the first protrusion having a height higher than a height of the second protrusion, a length longer than a length of the second protrusion, and a width wider that a width of the second protrusion.

9. The method for forming a resin impact energy absorber for vehicle according to claim 8, wherein, in the forming the thermoplastic resin sheet in the hermetic space, the thermoplastic resin sheet is formed by vacuuming the hermetic space so as to press the thermoplastic resin sheet against the mold cavity.

10. The method for forming a resin impact energy absorber for vehicle according to claim 8, wherein, in the forming the thermoplastic resin sheet in the hermetic space, the hermetic space is formed by clamping the thermoplastic resin sheet by the pair of split mold blocks.

11. The method for forming a resin impact energy absorber for vehicle according to claim 8, wherein at least one of the first and second grooves of the mold cavity has a cross-sectional surface with a trapezoidal shape perpendicular to an extending direction of the groove.

12. The method for forming a resin impact energy absorber for vehicle according to claim 8, wherein at least one of the first and second grooves of the mold cavity includes a pair of inclined vertical walls inclined at a predetermined inclination angle and facing one another.

13. The method for forming a resin impact energy absorber for vehicle according to claim 8, wherein at least one of the first and second grooves of the mold cavity includes a top wall that couples tops of the pair of inclined vertical walls, the top wall having a width of 8 to 25 mm.

14. The method for forming a resin impact energy absorber for vehicle according to claim 8, wherein, in the clamping, the thermoplastic resin sheet is clamped by the pair of split mold blocks for removing burrs of the thermoplastic resin sheet.

15. The method for forming a resin impact energy absorber for vehicle according to claim 14, wherein, opening the pair of split mold blocks, taking the thermoplastic resin sheet out from the pair of split mold blocks, and removing the burrs of the thermoplastic resin sheet.

16. A method for forming a resin impact energy absorber for vehicle, the method comprising:

providing a pair of split mold blocks, one of which having a mold cavity and another one of which having a pinch-off portion formed in relation to the mold cavity in a circular pattern and projected toward the one of the pair of split mold blocks, the mold cavity having a surface provided with a plurality of either first long grooves or first slender protrusions, and a plurality of either second long grooves or second slender protrusions, perpendicularly intersecting with the plurality of either the first long grooves or the first slender protrusions, to form first protrusions and second protrusions of the resin impact energy absorber, respectively;

extruding and introducing a molten thermoplastic resin sheet through an extrusion slit downward while pressing the molten thermoplastic sheet with a pair of rollers provided at a predetermined distance;

locating the molten thermoplastic resin sheet to face the mold cavity such that the molten thermoplastic resin sheet has an outer border outside the mold cavity;

forming a hermetic space between the mold cavity and a surface of the thermoplastic resin sheet that faces the mold cavity;

forming by vacuuming the thermoplastic resin sheet through the hermetic space so as to press the thermoplastic resin sheet against the mold cavity, clamping the thermoplastic resin sheet by the pair of split mold blocks by bringing the pinch-off portion of the another one of the pair of split mold blocks in contact with the one of the pair of split mold blocks to remove burrs of the thermoplastic resin sheet, wherein the method forms the first and second protrusions on the surface of the thermoplastic resin sheet, having complementary shapes to either the first and second long grooves, or the first and second slender protrusions, of the mold cavity, respectively, by having the thermoplastic resin sheet sucked to the mold cavity.

17. The method for forming a resin impact energy absorber for vehicle according to claim 16, wherein the mold cavity includes a planar portion including:

the plurality of first slender grooves to form the plurality of first protrusions of the resin impact energy absorber, disposed at a first predetermined interval; and the plurality of second slender grooves to form the plurality of second protrusions of the resin impact energy absorber, which extend perpendicularly intersecting with the plurality of first slender grooves, the plurality of second slender grooves being disposed at a second predetermined interval, and the plurality of first slender grooves have a protrusion height from the planar portion lower than a protrusion height of the plurality of second slender grooves from the planar portion, a protrusion length longer than a protrusion length of the plurality of second slender grooves, and a protrusion width wider than a protrusion width of the plurality of second slender grooves.

* * * * *